R. H. STULL.
ENGINE STARTER.
APPLICATION FILED OCT. 9, 1914.
1,143,460.
Patented June 15, 1915.
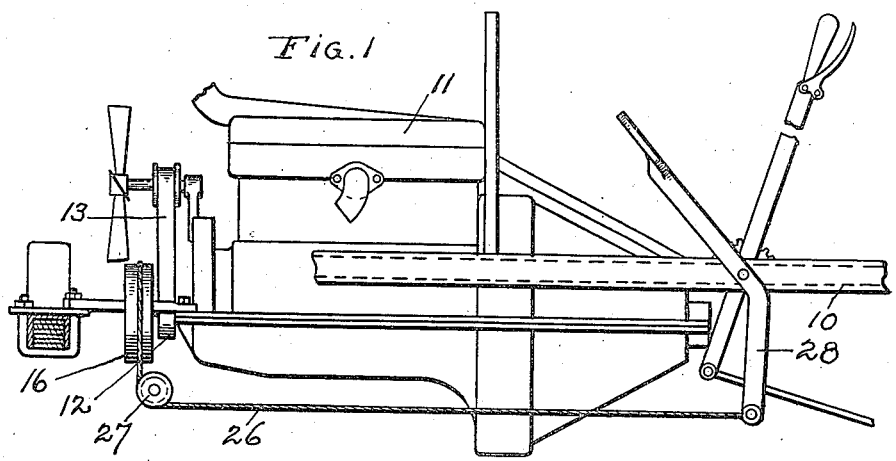
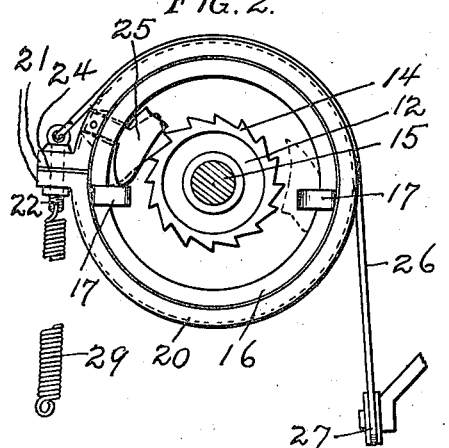
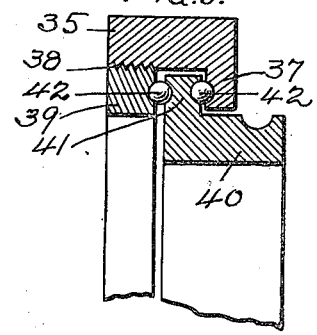
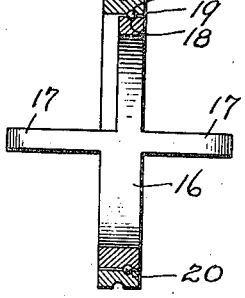
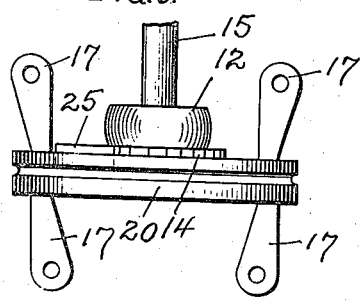
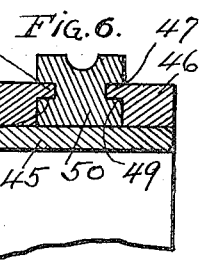
Witnesses
M. E. Smith
H. Joseph Doyle
Inventor
Roy H. Stull
By Hodges & Hodges
Attorneys

UNITED STATES PATENT OFFICE.

ROY H. STULL, OF SUNBURY, PENNSYLVANIA.

ENGINE-STARTER.

1,143,460.   Specification of Letters Patent.   Patented June 15, 1915.

Application filed October 9, 1914. Serial No. 865,874.

*To all whom it may concern:*

Be it known that I, ROY H. STULL, a citizen of the United States, residing at Sunbury, in the county of Northumberland and State of Pennsylvania, have invented new and useful Improvements in Engine-Starters, of which the following is a specification.

This invention is a mechanical device for initiating the rotation of the engine shaft of an explosive engine for the purpose of starting the operation of the latter.

One of the objects of the invention is to provide means whereby the chauffeur of an automobile may start the engine without leaving his seat.

A further object is to provide a mechanical starting device which will be simple and inexpensive in construction, and which may be readily applied to engines now in general use.

A further object is to provide means for automatically connecting the starting mechanism with the engine shaft when the controlling lever is moved in one direction, and for automatically disengaging the starting mechanism from the engine shaft when the lever is returned to its original position, or the engine is in operation.

The invention will be hereinafter set forth and particularly pointed out in the claims.

In the accompanying drawings:—Figure 1 is a diagrammatic view of a portion of an automobile with my invention applied thereto. Fig. 2 is an enlarged end view illustrating my improved starting mechanism, parts being shown in section. Fig. 3 is a top plan view. Fig. 4 is a vertical sectional view of the rings of Fig. 2. Figs. 5 and 6 are similar views of slight modifications.

Referring to the drawing, 10 designates an automobile of any preferred type, provided with the usual engine 11 and fan pulley 12, the latter being connected with the fan shaft by the usual belt 13. The fan pulley is provided with peripheral ratchet teeth 14, although it will be obvious that a separate ratchet wheel may be attached to the engine shaft 15, if desired.

The mechanism by which power is supplied for starting the engine comprises a supporting collar 16 provided with arms or standards 17 extending transversely from the collar and designed to be secured to the frame of the automobile in suitable manner, so that said ring and said engine shaft will be concentric. The upper part of the collar between arms 17 is reduced in width as shown. The periphery of said collar 16 is provided with a groove 18 forming a ball race for anti-friction balls 19. The actuating member is formed as a split ring 20 having radial lugs 21 at its meeting ends, said lugs being united by a bolt 22. The inner face of said ring is provided with a groove 23 to accommodate balls 19, said ring being free to rotate upon said collar. If desired washers 24 may be interposed between the abutting lugs 21, to permit adjustment to take up lost motion. The periphery of the actuating ring 20 is provided with an annular groove and within a recess in said ring is pivotally supported a pawl 25, one end of which is weighted to cause it to engage the teeth 14 of the ratchet, by gravity. A cable 26 is secured at one end in suitable manner to the actuating bolt 22, and after being passed around said ring in the groove of the latter, said cable is passed back around suitable pulleys 27 and connected with an operating lever 28 pivotally supported in a convenient place for engagement by the foot of the operator. A coiled spring 29 is also secured at one end to the actuating ring, the other end being secured to a fixed point.

The pawl 25 is normally in the full line position, Fig. 2, disengaged from the ratchet teeth, the spring 29 acting to hold the rear end of the pawl in engagement with one of the rear arms 17, the pressure causing the pawl to rock away from the ratchet. When it is desired to start the engine a slight movement of the lever relieves the pawl of the spring pressure and permits it to engage the ratchet. The operator then pushes down on the lever 28, thereby effecting a pull upon the cable 26. This pull by reason of the connection of the cable with the ring 20 effects a partial rotation of the latter, and at the same time causes the pawl 25, which is engaged with one of the teeth of the ratchet 15, to impart corresponding movement to pulley 12. It is obvious that when this engagement is effected rotation of the ring 20 will impart corresponding rotation to the engine shaft 15 through the ratchet wheel 15. As soon as the lever 28 is operated and the engine started said lever will be locked in its forward position, the pawl being held by gravity, out of engagement with the ratchet teeth. The oscillations of lever 28 may be repeated should the first operation fail to start the engine, the parts being so proportioned that at the first operation of the lever 28 two cylinders of a four cylinder engine are operated, and at the second operation of the lever the other two cylinders will be operated.

In Fig. 5 I have illustrated a slight modification in which the supporting collar 35 has an overhanging annular flange 37. Said overcollar is interiorly threaded at 38 to receive a bearing ring 39. The actuating ring 40 is provided with a peripheral flange 41 which extends between ring 39 and flange 37, suitable antifriction balls 42 being employed to reduce friction, if desired. The pawl and ratchet members are arranged as heretofore described.

In the form illustrated in Fig. 6 I employ a supporting collar 45 to which are secured bearing collars 46, 47, said collars being provided with overhanging annular flanges 48 which engage corresponding grooves 49 in the sides of an actuating ring 50, the arrangement being such that the collars 46 and 47 rotatably support the ring 50. The pawl and ratchet devices are the same as described in connection with the other figures.

Having thus explained the nature of my invention and described an operative manner of constructing and using the same, although without attempting to set forth all of the forms in which it may be made, or all of the forms of its use, what I claim is:—

1. An engine starter comprising a supporting collar, an engine starting member, an actuating ring, means for imparting a partial rotation to said actuating ring, a gravity controlled member carried by said actuating ring to engage said starting member when rotation of the ring is initiated, and means for normally retaining said ring in a predetermined starting position, said gravity controlled member being normally disengaged from said starting member when said ring is in said predetermined position.

2. An engine starter comprising a supporting collar, an actuating ring rotatably supported by said collar, an engine-starting ratchet mounted independently of said collar and said ring and inclosed by the latter, a pawl carried by said ring to engage said ratchet, and means for oscillating said ring, said pawl being provided with gravity means for automatically disengaging the same from said ratchet, when the pawl and ratchet have been moved a predetermined distance in the direction to start the engine.

3. An engine starter comprising a supporting collar, an actuating ring rotatably supported by said collar, an engine-starting ratchet mounted independently of said collar and said ring and inclosed by the latter, a pawl carried by said ring to engage said ratchet, and means for oscillating said ring, said pawl being provided with an overweighted ratchet engaging end, for automatically disengaging the pawl when the pawl and ratchet have moved a predetermined distance in a direction to start the engine.

4. An engine starter comprising a supporting collar, an actuating ring rotatably supported by said collar, an engine-starting ratchet mounted independently of said collar and said ring and inclosed by the latter, a pawl carried by said ring to engage said ratchet, and means for oscillating said ring, said collar having a portion of reduced width to permit uninterrupted travel of said pawl around said ratchet when the ring is actuated.

5. An engine starter comprising a supporting collar, an actuating ring rotatably supported by said collar, an engine-starting ratchet mounted independently of said collar and said ring and inclosed by the latter, a pawl carried by said ring to engage said ratchet, and means for oscillating said ring, said collar having a portion of reduced width to permit uninterrupted travel of said pawl around said ratchet when the ring is actuated, said pawl being provided with gravity means for automatically disengaging the pawl from the ratchet after moving a predetermined distance in a direction to start the engine.

6. An engine starter comprising a supporting collar, means for rigidly supporting the same, an actuating member formed of a split ring surrounding said collar and rotatable thereon, the ends of said ring being provided with angularly disposed lugs, a bolt connecting said lugs, an engine starting ratchet encircled by said ring and collar, a pawl carried by said ring, an actuating cable connected at one end to said bolt, and a spring connected with the other end of said bolt.

In testimony whereof I have hereunto set my hand in presence of two subscribing witnesses.

ROY H. STULL.

Witnesses:
S. H. KIRKPATRICK,
GEO. G. SNYDER.